(12) United States Patent
Tastl et al.

(10) Patent No.: US 10,482,356 B2
(45) Date of Patent: Nov. 19, 2019

(54) SOFT-PROOF FILE GENERATION BASED ON PRINT-READY DATA

(71) Applicant: Hewlett-Packard Development Company, L.P., Houston, TX (US)

(72) Inventors: Ingeborg Tastl, Palo Alto, CA (US); Marcelo Riss, Porto Alegre (BR); Thiago Moura, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/545,848

(22) PCT Filed: Apr. 30, 2015

(86) PCT No.: PCT/US2015/028419
§ 371 (c)(1),
(2) Date: Jul. 24, 2017

(87) PCT Pub. No.: WO2016/175815
PCT Pub. Date: Nov. 3, 2016

(65) Prior Publication Data
US 2018/0018545 A1    Jan. 18, 2018

(51) Int. Cl.
*G06K 15/02* (2006.01)
*G06F 3/12* (2006.01)
*G06F 3/0484* (2013.01)

(52) U.S. Cl.
CPC ......... *G06K 15/026* (2013.01); *G06F 3/1204* (2013.01); *G06F 3/1205* (2013.01); *G06F 3/1206* (2013.01); *G06F 3/1208* (2013.01); *G06F 3/1227* (2013.01); *G06F 3/1247* (2013.01); *G06F 3/1256* (2013.01); *G06F 3/1257* (2013.01); *G06F 3/1285* (2013.01); *G06F 3/04842* (2013.01)

(58) Field of Classification Search
CPC combination set(s) only.
See application file for complete search history.

(56) References Cited

U.S. PATENT DOCUMENTS

| 8,743,421 | B1 | 6/2014 | Ross et al. |
| 2002/0008880 | A1 | 1/2002 | Dewitte |
| 2002/0080378 | A1 | 6/2002 | Nishida et al. |
| 2005/0062757 | A1 | 3/2005 | Nakamori |

(Continued)

FOREIGN PATENT DOCUMENTS

| CN | 102096563 | 6/2011 |
| CN | 103677692 | 3/2014 |

(Continued)

OTHER PUBLICATIONS

Wu, Y.J. et al, "Digital Proofing of Spot Color Printing", Feb. 11, 2007.

*Primary Examiner* — Helen Zong
(74) *Attorney, Agent, or Firm* — HP Inc. Patent Department

(57) ABSTRACT

In one implementation, a method for generation of a soft-proof file is described. A ticket template and a job definition are associated with input contents. Print-ready data is caused to be generated based on the input content, the job definition, and the ticket template. A soft-proof file is caused to be generated based on the print-ready data, the ticket template, and the job definition.

15 Claims, 5 Drawing Sheets

(56) References Cited

U.S. PATENT DOCUMENTS

| | | | |
|---|---|---|---|
| 2005/0179727 A1 | 8/2005 | Bestmann | |
| 2006/0066925 A1 | 3/2006 | Hasegawa et al. | |
| 2006/0109497 A1* | 5/2006 | Ferlitsch | G06F 3/1205 |
| | | | 358/1.15 |
| 2006/0274354 A1 | 12/2006 | Farrell | |
| 2007/0008557 A1 | 1/2007 | Harrington et al. | |
| 2007/0253020 A1 | 11/2007 | Hull et al. | |
| 2008/0043265 A1 | 2/2008 | Kim et al. | |
| 2008/0297814 A1* | 12/2008 | Jacobs | G06F 3/1207 |
| | | | 358/1.9 |
| 2011/0019213 A1* | 1/2011 | Safonov | G06K 15/128 |
| | | | 358/1.9 |
| 2011/0188069 A1 | 8/2011 | Giannetti et al. | |
| 2011/0235090 A1* | 9/2011 | Salgado | G06F 3/1205 |
| | | | 358/1.15 |
| 2011/0286040 A1 | 11/2011 | Seto et al. | |
| 2014/0036283 A1* | 2/2014 | Tastl | H04N 1/60 |
| | | | 358/1.9 |
| 2015/0242723 A1* | 8/2015 | Tokushima | G06K 15/1807 |
| | | | 358/1.15 |
| 2015/0262044 A1* | 9/2015 | Sochi | G06K 15/1857 |
| | | | 358/1.15 |
| 2016/0179439 A1* | 6/2016 | Kanamoto | G06F 3/1205 |
| | | | 358/1.15 |
| 2018/0126663 A1* | 5/2018 | Jun | B29C 67/00 |

FOREIGN PATENT DOCUMENTS

| | | |
|---|---|---|
| CN | 104309309 | 1/2015 |
| JP | 2007265419 | 10/2007 |

* cited by examiner

SOFT-PROOF FILE GENERATION BASED ON PRINT-READY DATA

BACKGROUND

Users of imaging devices, such as a printer or a digital press, may have an expectation that a produced artifact from the imaging device accurately represents the content and appearance requested for production. A preview of a printed artifact can be created using a process called "proofing." A "proof" is used to communicate to the customer how the final output may look like. For example, a customary may verify (e.g., sign-off) that the expected print corresponds to expectations of the customer that requests the print.

DETAILED DESCRIPTION

Figure 1:
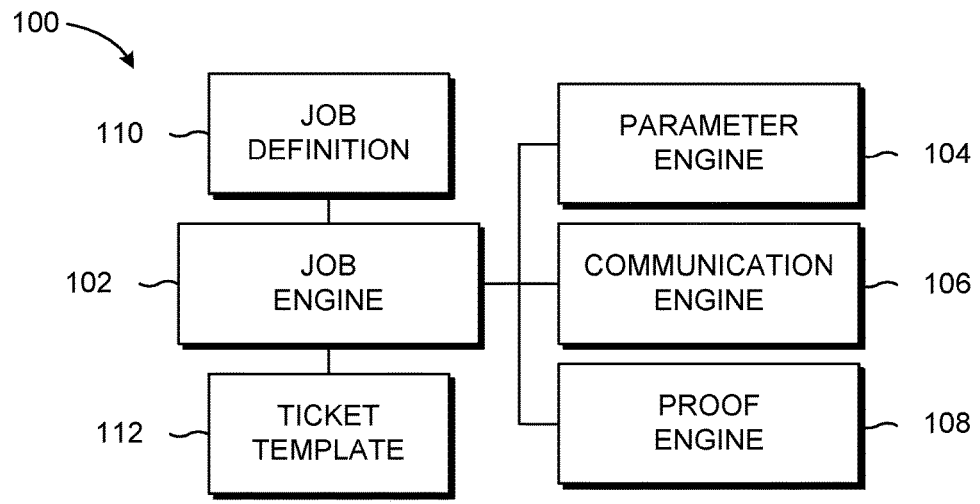
FIGS. 1 and 2 are block diagrams depicting example soft-proof systems.

In the following description and figures, some example implementations of soft-proof systems and/or methods for generating a soft-proof file are described. It may be difficult to produce an accurate proof of an item that is to be printed by an imaging system. A "proof", as used herein, refers to a user-viewable representation of content to be printed. Proofs may be hard-copy-proofs or soft-proofs. Hard-copy proofs are typically produced by specific hardware also known as "proofers." As used herein, a "soft-proof" refers to a digital file that is presentable via a display, such as a computer monitor or other visualization hardware, rather than a physical, printed reproduction of the final product on a proofing device. Soft-proofing techniques aim to produce files that, when seen at the customer's monitor, may appear as close as possible to the final product. Example items to be printed (e.g., the final product) include documents, brochures, booklets, user manuals, photo books, holiday cards, marketing materials, etc. Another example of a printable item is a three-dimensional (3D) model produced by a 3D printer, such as a sculpture, a toy, a replacement part for a device, etc.

In examples described herein, an "imaging device" may be a device to print content on a physical medium (e.g., paper or a layer of powder-based build material, etc.) with a printing fluid (e.g., ink) or toner. In the case of printing on a layer of powder-based build material, the imaging device may utilize the deposition of printing fluids in a layer-wise additive manufacturing process. An imaging device may utilize suitable printing consumables, such as ink, toner, fluids or powders, or other raw materials for printing. In some examples, an imaging device may be a 3D printing device.

Printable content may include various colors to be produced on the imaging device. Colors may vary based on an imaging device, a substrate, print settings, configuration of an imaging device, and any changes in the content (e.g. formatting, compression, etc.) during the print job process. Systems that utilize simulations, for example, provide a converted form of content as a preview based on generalized assumptions of the processes and conversions used during production. Furthermore, procedures used to apply the transformations for generating the soft proof might be different from the specific procedures used for production. In such processes, colors in the simulation or proof may, for example, not match the colors in a printed item as produced by the imaging system.

Various examples described below may relate to, for example, improved accuracy in generating soft-proof files based on utilizing a job definition and a ticket template that are associated with a device class and a content class. The combination of a job definition and a ticket template provide the print settings to be used for production by an imaging device of the device class. As used herein, a "job definition" refers to a data structure for providing the content and settings specific to a print job. A "ticket template," as used herein, refers to a data structure comprising a plurality of parameters representing print settings for the environment of the content class. By matching the print settings for an imaging device class and a class of content printable by a print service provider (PSP) using the device class, a soft-proof file may be generated with the same settings as used during production (e.g., the printing of the print job by the imaging device) by using the data produced from production preparation system that utilizes those print settings. As used herein, a "production preparation system" represents circuitry or a combination of circuitry and executable instructions to prepare content for production by an imaging device. For example, a production preparation system may comprise a raster image processor (RIP) that is able to generate ripped data in a format readable by a target imaging device for production. In this manner, print accuracy and consistency of settings may, for example, be maintained among the soft-proof process and production.

The terms "include," "have," and variations thereof, as used herein, mean the same as the term "comprise" or appropriate variation thereof. Furthermore, the term "based on," as used herein, means "based at least in part on." Thus, a feature that is described as based on some stimulus can be based only on the stimulus or a combination of stimuli including the stimulus. Furthermore, as used herein, the verb "to cause" means to directly perform an action, invoke performance of an action, initiate operations of an action, and/or send instructions to perform an action.

Figure 2:
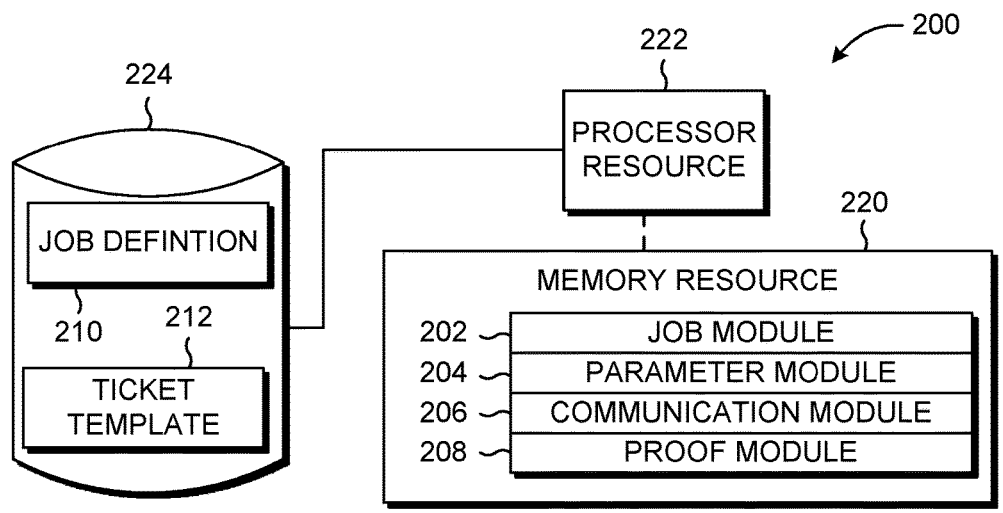

FIGS. 1 and 2 are block diagrams depicting example soft-proof systems. Referring to FIG. 1, the example soft-proof system 100 of FIG. 1 generally includes a job engine 102, a parameter engine 104, a communication engine 106, and a proof engine 108. In general, the proof engine 108 can produce a soft-proof file based on print-ready data requested by the communication engine 108 where the print-ready data is produced based on the parameters identified by the parameter engine 104 using a job definition, such as job definition 110, and a ticket template, such as ticket template 112, obtained by the job engine 102. As used herein, a soft-proof file represents a data structure, such as an electronic file, that comprises soft-proof data ready to be made viewable to a user.

The job engine 102 represents any circuitry or combination of circuitry and executable instructions to obtain a job definition and a ticket template. The job definition 110 may be obtained, for example, via an application programming interface (API) such as a request for producing a print. The job definition may comprise a data structure, such as an electronic file, having a job specification of a target image device and a reference pointer to content to use as the source of production. For example, the job definition engine 102 may determine the device class by identifying the type of device to be used for production of the print job. A device class may include a brand, a model, a configuration, firmware version, or any other appropriate differentiation of categories of imaging devices. A job specification includes print settings associated with the job. The job definition and/or the ticket template may include color management profiles that are specific to a PSP. The job definition may comprise a reference pointer to a ticket template. In this manner, the job definition may, for example, maintain fidelity during production and proofing by associating a ticket template with a job definition.

The ticket template may comprise a data structure of configuration settings including color management settings specific to a target image device and specific to a print job for the content of the job definition. The ticket template may be obtained via a direct print job request (such as via an API), indirectly through interactions with a production device, and/or may be obtained from a ticket template storage. For example, the job engine 102 may interface with a digital front end (IFF) to obtain the job definition and ticket template. The ticket template obtained by the job engine 102 for the print job is to be compatible with a device class of a target imaging device to be used for production and is to be usable with a content class of content acceptable by a PSP. For example, a photo book ticket template may be retrieved from ticket template storage for a request for a photo book. A content class may include a content type, a content format, a page size, a page orientation, or any other appropriate differentiation of types of content that may be printed by a PSP. A ticket template used for a specific type of content used by a specific PSP might be the same or different from the ticket template used for the same content by another PSP. Variations may, for example, be based on the International Color Code (ICC) output profiles used by a specific PSP.

The job engine 102 may store the ticket template in a ticket template storage (such as data store 224 of FIG. 2) in response to a determination that the ticket template is not in the ticket template storage. The ticket template storage may store a variety of ticket templates based on combinations of the content class and device class targeted for production.

The job engine 102 may associate a ticket template with an identifier. The job engine 102 may manage identifiers of the ticket templates. For example, the job engine 102 may designate an identifier to associate with a ticket template. An identifier may be a number, a character, a string, a category, or other value that allows for identification among a quantity of elements. For another example, an identifier may be a reference pointer to a location where the ticket template is stored, such as a pointer used in a job definition file. The identifier may be designated as particular to a class of content and/or particular to a device class used for print production. For example, a ticket template may contain a first identifier marking the types of devices for which the ticket template can be used and second identifier marking the types of content the ticket template can be used with. For another example, a separate ticket template may be created for each type of content made available by a PSP. Ticket templates may be usable across PSPs or specific to a particular PSP. For example, a first PSP may have different types of printers used for production in comparison to a second PSP. For another example, a first PSP may not offer the same types of content as a second PSP. Thus, the ticket templates may be presented for selection by the job engine 102 based on the content classes designated as acceptable by the PSP. The job engine 102 may use an identifier to retrieve a ticket template from the ticket template storage based on the job definition, a class of content (e.g., a content type selected by a user), and a PSP (e.g., the PSP may limit the classes of content or available print settings).

The parameter engine 104 represents any circuitry or combination of circuitry and executable instructions to identify a plurality of parameters of a ticket template. For example, the parameter engine 104 may retrieve a parameter data structure within a ticket template where the parameter data structure contains a list of parameters to be used for production. For another example, a ticket template may comprise an identifier of a combination of device class and content class, and the parameter engine 104 may select a plurality of parameters to use for soft-proofing that correspond to the device class and content class. The plurality of parameters may relate to print settings, such as RIP settings corresponding to color management. Color management settings may include, for example, how red green blue (RGB) source data is transferred into cyan magenta yellow black (CMYK) data, which source and destination ICC profiles are used, how spot colors (e.g. PANTONE colors) in the original content are reproduced. The plurality of parameters of the ticket template correspond to the parameters that are usable at production by the PSP. If production parameters change, the ticket templates corresponding to the changes of the parameters may be updated accordingly. The identifiers associated with the ticket templates may also change. In this manner, accuracy in production, for example, may be maintained by allowing use of ticket templates that correspond with parameters that work with the imaging devices used by the PSP.

The communication engine 106 represents any circuitry or combination of circuitry and executable instructions to cause print-ready data to be generated, such as by a production preparation system, based on the plurality of parameters of the ticket template and the job definition. For example, the communication engine 106 may be a combination of circuitry and executable instructions to configure a RIP with the settings of the ticket template and the job definition using the proper RIP communication protocol and instruct the RIP to process the content provided by the job definition. In response to the above example ripping process request, the communication engine 106 may receive the ripped data or the ripped data may be sent directly to the proof engine 108. The communication protocol used by the communication engine 106 may facilitate transferring the job information (e.g., the job definition, the ticket template, and the source content) to the production system. For example, the communication protocol may include a job message format, such as extensible markup language (XML), with a structure including reference pointers to download files on a shared folder, such as job definition files comprising print settings (such as a number of copies, the page size, color management information, etc.), a reference pointer to the ticket template, a reference pointer to the source content, etc.

The communication engine 108 may interface with a production preparation system. A production preparation system may perform any appropriate operations to change content data into a form that is ready to be printed (e.g., ready for use in a production operation of an imaging device). The production preparation system creates print-ready data from a source, such as input content. In other words, the production preparation system may perform a mapping from content to image element information. As used herein, "print-ready data" refers to data having image element information compatible with an imaging device to produce an artifact (e.g., data that is ready for production).

As used herein, an artifact is a printable item, such as a document, a picture, a 3D model, etc. Print-ready data may comprise setting information (based on the job definition and ticket template) as well as image element information, such as a pixel color information or voxel color information. One example of print-ready data is rasterized data (discussed herein as "ripped data") generated by a RIP of a production preparation system where the rasterized data comprises a matrix of pixel color information in a format usable by hardware of an imaging device. Another example of print-ready data is 3D print-ready layer information generated by a processor resource of the print production system, such as the result of rasterized layer data describing voxel attributes to use in a 3D printing production process. An image element is a representation of a physical point of an artifact, such as the smallest addressable element of an image. Example image elements include a pixel for two-dimensional (2D) imaging and a voxel for 3D imaging. The image element information may be the color information for each image element (e.g., for each pixel or voxel) or a format that maps to color information of the image elements of the content to be produced into an artifact.

The print-ready data is formatted to be readable by the target imaging device for the purposes of production. Though an image format may be accepted by an imaging device for a print job, the format of the print-ready data refers to a production-level format that is directly usable by the hardware of the imaging device (e.g., the internal components of the imaging device may use the print-ready data in the production process without further human-level code conversion in order to produce an artifact.) For example, the print-ready data may contain image element information in a format understandable by the specific hardware that actuates the marking device (e.g., a printer pen) of the imaging device to produce a particular amount of print fluid (e.g., a particular size, a particular color, and/or a particular type of print fluid) at a location.

The production preparation systems discussed herein use a job definition and a ticket template in the process of generating print-ready data. By utilizing the data that is ready for production, integrity and accuracy may, for example, be sustained in generation of a soft-proof. A production preparation system may perform operations such as interpretation, rendering, and screening. For example, a production preparation system may perform the operations of ripping, such as interpreting the content into a renderable representation, render the representation into a continuous tone bitmap, and converting a continuous tone bitmap into a half tone. For another example, a 3D print production preparation system may perform the operations of interpreting the content into geometric data, slicing the data into layers, and generating layer information printable by a 3D print imaging device. In both the 2D and 3D print examples of production preparation system operations, color space profiles may be identified at the interpretation stage and color transformation may be performed at the rendering stage, for example. As discussed herein, the color transformation operation of a production preparation system uses the job definition and the ticket template in preparing the print-ready data. Whether 2D ripped data or 3D layer information, the print-ready data may comprise color management information, such as the result of application of the color space profiles during the rendering stage. The soft-proofing operations are performed on the print-ready data using the same job definition and ticket template to, for example, create consistency among the attributes of a produced artifact and the attributes of the soft-proof, such as consistency of color.

The print-ready data is formatted to be readable by the target imaging device. In some examples, the print-ready data may be represented as an electronic file that comprises data of the job definition and the ticket template as well as image element information. The print-ready data may be a proprietary format used for production on the target imaging device or may be a device-independent format with conversion specific to the imaging device used for production (e.g., specific to the device class of imaging device used by the PSP to produce the items of a particular content class). The print-ready data may be generated from an electronic file in an image format. Example image formats that may be useable by the soft-proof system 100 include Portable Document Format (PDF), Joint Photographic Experts Group (JPEG) format, Tagged Image File Format (TIFF), and Portable Network Graphics (PNG). The image format selected by the user determines in which format color information may be encoded. For example, PNG format may be used for RGB color content and JPEG may be used for CMYK content. It is, preferable to avoid any unnecessary color transformation in order to achieve a level accuracy of the soft proof. For example, if the content is reproduced with CMYK inks the highest possible accuracy may be achieved when the color is encoded in the form of CMYK content and may not be achieved when the color is encoded in the form of RGB content. The image format used for the soft proofs may or may not be the same image format of the content provided with the job definition.

The proof engine 108 represents any circuitry or combination of circuitry and executable instructions to generate a soft-proof file based on the print-ready data, the job definition, and the plurality of parameters of the ticket template. For example, the proof engine 108 may comprise a processor resource to convert the print-ready data to a soft-proof file using the ripped data, the job definition, and the ticket template. By using the print-ready data (e.g., the actual ripped data to be used for production), the soft-proof file may, for example, avoid errors in soft-proofing (such as color conversion errors) by avoiding RIP simulation to create the soft-proof file. Once the soft-proof is rendered, the proof engine 108 may make the soft-proof available to a user. For example, the proof engine 108 may interface with a client application to store the soft-proof file in a client storage. For another example, the proof engine 108 may interface with a DFE to make the soft-proof available for viewing by the user. Using the production preparation system that is used for production by the PSP may allow for accuracy in quality to be maintained, for example.

The proof engine 108 may utilize technique(s), such as a color management technique, to convert the print-ready data to a soft-proof. As an example, the print-ready data may contain only CMYK content, which may be directly encoded for TIFF, PDF, or JPEG file formats, and for PNG file formats the color information can be converted into RGB using an ICC CMYK profile from the ticket template. For another example, the print-ready data may contain CMYK content plus spot color information and production may use customized inks so that the spot colors may be replaced by production values that correspond to color measurements of printed spot colors and the production values can be converted into CMYK or RGB values for the soft-proof file. In some examples, functionalities described herein in relation to any of FIGS. 1-3 may be provided in combination with functionalities described herein in relation to any of FIGS. 4-7.

FIG. 2 depicts the example system 200 can comprise a memory resource 220 operatively coupled to a processor resource 222. The processor resource 222 can be operatively coupled to a data store 224. The data store 224 can contain information utilized by the engines 102, 104, 106, and 108. For example, the data store 224 can store a job definition file 210 and a ticket template 212, which represent the same data structures as job definition 110 and ticket template 112 of FIG. 1.

Referring to FIG. 2, the memory resource 220 can contain a set of instructions that are executable by the processor resource 222. The set of instructions are operable to cause the processor resource 222 to perform operations of the system 200 when the set of instructions are executed by the processor resource 222. The set of instructions stored on the memory resource 220 can be represented as a job module 202, a parameter module 204, a communication module 206, and a proof module 208. The job module 202, the parameter module 204, the communication module 206, and the proof module 208 represent program instructions that when executed function as the job engine 102, the parameter engine 104, the communication engine 106, and the proof engine 108 of FIG. 1, respectively. The processor resource 222 can carry out a set of instructions to execute the modules 202, 204, 206, 208, and/or any other appropriate operations among and/or associated with the modules of the system 200. For example, the processor resource 222 can carry out a set of instructions to retrieve a ticket template from a ticket template storage (such as data store 224) based on a job definition file, a class of content, and a PSP; request a ripped file to be generated by a RIP based on the ticket template, the job definition file, and the input content; and cause the processor resource to generate a soft-proof file based on the ripped file, the job definition file, and the ticket template. As used herein, a ripped file represents a data structure, such as an electronic file, that comprises ripped data generated by a RIP. For another example, the processor resource 222 can carry out a set of instructions to download a job definition file from a shared folder using a reference pointer supplied by a communication protocol, identify print settings based on the job definition file, preprocess input content using a ticket template, request generation of print-ready data, check a folder periodically for the print-ready data, forward the print-ready data to a processor queue upon determination of existence of the print-ready data in the folder, and cause the processor resource of the processor queue to generate a soft-proof file based on the print-ready data, the job definition file, and the ticket template.

Although these modules are illustrated and discussed in relation to FIG. 2 and other example implementations, other combinations or sub-combinations of modules can be included within other implementations. Said differently, although the modules illustrated in FIG. 2 and discussed in other example implementations perform specific functionalities in the examples discussed herein, these and other functionalities can be accomplished, implemented, or realized at different modules or at combinations of modules. For example, two or more modules illustrated and/or discussed as separate can be combined into a module that performs the functionalities discussed in relation to the two modules. As another example, functionalities performed at one module as discussed in relation to these examples can be performed at a different module or different modules.

The processor resource 222 is any appropriate circuitry capable of processing (e.g., computing) instructions, such as one or multiple processing elements capable of retrieving instructions from the memory resource 220 and executing those instructions. For example, the processor resource 222 can be a central processing unit ("CPU") that enables soft-proof file generation by fetching, decoding, and executing modules 202, 204, 206, and 208. Example processor resources 222 include at least one CPU, a semiconductor-based microprocessor, a programmable logic device ("PLD"), and the like. Example PLDs include an application specific integrated circuit ("ASIC"), a field-programmable gate array ("FPGA"), a programmable array logic ("PAL"), a complex programmable logic device ("CPLD"), and an erasable programmable logic device ("EPLD"). The processor resource 222 can include multiple processing elements that are integrated in a single device or distributed across devices. The processor resource 222 can process the instructions serially, concurrently, or in partial concurrence.

The memory resource 220 and the data store 224 represent a medium to store data utilized and/or produced by the system 200. The medium is any non-transitory medium or combination of non-transitory media able to electronically store data, such as modules of the system 200 and/or data used by the system 200. For example, the medium can be a storage medium, which is distinct from a transitory transmission medium, such as a signal. The medium can be machine-readable, such as computer-readable. The medium can be an electronic, magnetic, optical, or other physical storage device that is capable of containing storing) executable instructions. The memory resource 220 can be said to store program instructions that when executed by the processor resource 222 cause the processor resource 222 to implement functionality of the system 200 of FIG. 2. The memory resource 220 can be integrated in the same device as the processor resource 222 or it can be separate but accessible to that device and the processor resource 222. The memory resource 220 can be distributed across devices. The memory resource 220 and the data store 224 can represent the same physical medium or separate physical media. The data of the data store 202 can include representations of data and/or information mentioned herein.

In the discussion herein, the engines 102, 104, 106, and 108 of FIG. 1 and the modules 202, 204, 206, and 208 of FIG. 2 have been described as circuitry or a combination of circuitry and executable instructions. Such components can be implemented in a number of fashions. Looking at FIG. 2, the executable instructions can be processor-executable instructions, such as program instructions, stored on the memory resource 220, which is a tangible, non-transitory computer-readable storage medium, and the circuitry can be electronic circuitry, such as processor resource 222, for executing those instructions. The instructions residing on the memory resource 220 can comprise any set of instructions to be executed directly (such as machine code) or indirectly (such as a script) by the processor resource 222.

In some examples, the system 200 can include the executable instructions as part of an installation package that when installed can be executed by the processor resource 222 to perform operations of the system 200, such as methods described with regards to FIGS. 4-7. In that example, the memory resource 220 can be a portable medium such as a compact disc, a digital video disc, a flash drive, or memory maintained by a computer device, such as a service device 334 of FIG. 3, from which the installation package can be downloaded and installed. In another example, the executable instructions can be part of an application or applications already installed. The memory resource 220 can be a non-volatile memory resource such as read only memory ("ROM"), a volatile memory resource such as random access memory ("RAM"), a storage device, or a combination thereof. Example forms of a memory resource 220 include static RAM ("SRAM"), dynamic RAM ("DRAM"), electrically erasable programmable ROM ("EEPROM"), flash memory, or the like. The memory resource 220 can include integrated memory such as a hard drive ("HD"), a solid state drive ("SSD"), or an optical drive.

Figure 3:
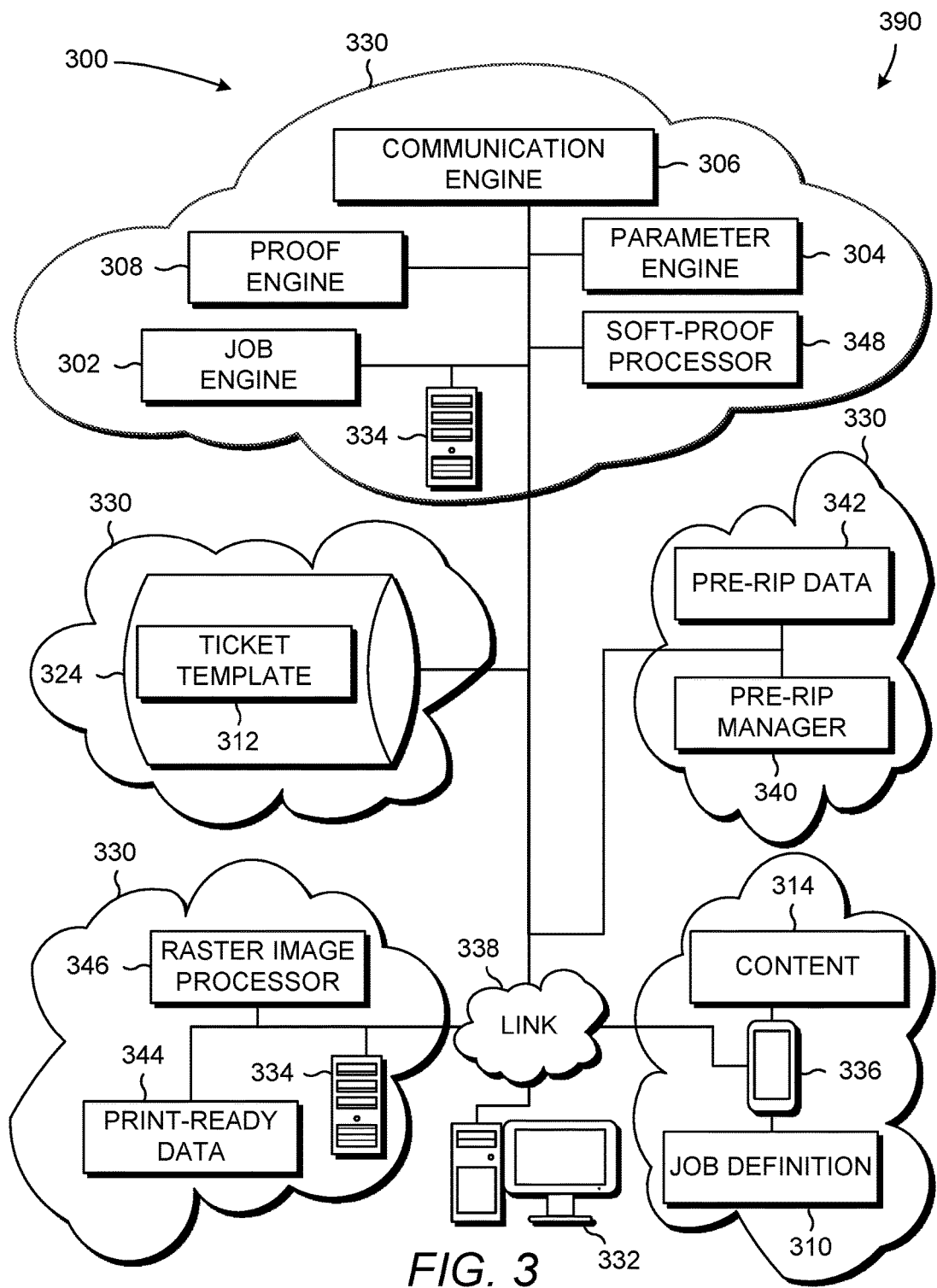
FIG. 3 depicts an example environment in which various soft-proof systems may be implemented.

FIG. 3 depicts example environments in which various example soft-proof systems can be implemented. The example environment 390 is shown to include an example system 300 for soft-proof file generation. The system 300 (described herein with respect to FIGS. 1 and 2) can represent generally any circuitry or combination of circuitry and executable instructions to generate a soft-proof file. The system 300 can include a job engine 302, a parameter engine 304, a communication engine 306, and a proof engine 308, that are the same as the job engine 102, the parameter engine 104, the communication engine 106, and the proof engine 108 of FIG. 1, respectively, and the associated descriptions are not repeated for brevity. As shown in FIG. 3, the engines 302, 304, 306, and 308 can be integrated into a compute device, such as a service device 334. The engines 302, 304, 306, and 308 can be integrated via circuitry or as installed instructions into a memory resource of the compute device.

The example environment 390 can include compute devices, such as administrator devices 332, service devices 334, and user devices 336. For example, a plurality of ticket templates can be created and/or uploaded to the system 300 by an administrator device 332 and stored onto a web server, such as a service device 334. The service devices 334 represent generally any compute devices to respond to a network request received from a user device 336, whether virtual or real. For example, the service device 334 can operate a combination of circuitry and executable instructions to provide a network packet in response to a request for a page or functionality of an application. For another example, the service device 334 may comprise the production preparation system and may include a raster image processor 346. The user devices 336 represent generally any compute devices to communicate a network request and receive and/or process the corresponding responses. For example, a browser application may be installed on the user device 336 to receive the network packet from the service device 334 and utilize the payload of the packet to display an element of a page, such as a soft-proof file, via the browser application.

As depicted in FIG. 3, the system 300 may include a soft-proof processor 348, a raster image processor (RIP) 346, ticket template storage 324, and a pre-rip manager 340, which may be distributed across compute devices, or integrated into a single compute device, such as service device 334. The soft-proof processor 324 represents any processor resource capable to perform or assist in performing soft-proofing operations and the RIP 346 represents any processor resource capable to perform raster image processing. Though the soft-proof processor 348 and the RIP 346 are depicted as separate from other engines or devices, the soft-proof processor 348 and/or the RIP 346 may be integrated into another engine or device depicted in FIG. 3, such as the proof engine 308 and/or service device 334. For example, the service device 334 may comprise a production preparation system that includes a RIP 346 and executable instructions to convert content 314 to print-ready data 344 using the job definition 310 and the ticket template 312. The pre-rip manager 340 represents any circuitry or combination of circuitry and executable instructions to perform operations on the content 314 identified by the job definition 310 to prepare the data for the ripping process (e.g., create the pre-rip data 342). For example, the pre-rip manager 340 can be a combination of circuitry and executable instructions to perform (or cause to perform) preprocessing of the input content 314 using the ticket template 312 to produce pre-rip data 342 that may be used by the RIP 346 to create ripped data, such as the print-ready data 344, rather than directly using the content 314 associated with the job definition 310. Example preprocessing may include pre-raster-image-processing (pre-RIP) color management operations associated with the input content, such as pre-RIP color management operations that use the parameters of the ticket template. The job definition 310 and the ticket template 312 may be the same as the job definition 110 and the ticket template 112 of FIG. 1.

The compute devices can be located on separate networks 330 or part of the same network 330. The example environment 390 can include any appropriate number of networks 330 and any number of the networks 330 can include a cloud compute environment. A cloud compute environment may include a virtual shared pool of compute resources. For example, networks 330 can be distributed networks comprising virtual computing resources. Any appropriate combination of the system 300 and compute devices can be a virtual instance of a resource of a virtual shared pool of resources. The engines and/or modules of the system 300 herein can reside and/or execute "on the cloud" (e.g., reside and/or execute on a virtual shared pool of resources).

A link 338 generally represents one or a combination of a cable, wireless connection, fiber optic connection, or remote connections via a telecommunications link, an infrared link, a radio frequency link, or any other connectors of systems that provide electronic communication. The link 338 can include, at least in part, intranet, the Internet, or a combination of both. The link 338 can also include intermediate proxies, routers, switches, load balancers, and the like.

Referring to FIGS. 1-3, the engines 102, 104, 106, and 108 of Figure and/or the modules 202, 204, 206, and 208 of FIG. 2 can be distributed across devices 332, 334, 336, or a combination thereof. The engine and/or modules can complete or assist completion of operations performed in describing another engine and/or module. For example, the proof engine 308 of FIG. 3 can request, complete, or perform the methods or operations described with the proof engine 108 of FIG. 1 as well as the job engine 102, the parameter engine 104, and the communication engine 106 of FIG. 1. Thus, although the various engines and modules are shown as separate engines in FIGS. 1 and 2, in other implementations, the functionality of multiple engines and/or modules may be implemented as a single engine and/or module or divided in a variety of engines and/or modules. In some example, the engines of the system 300 can perform example methods described in connection with FIGS. 4-7.

Figure 4:
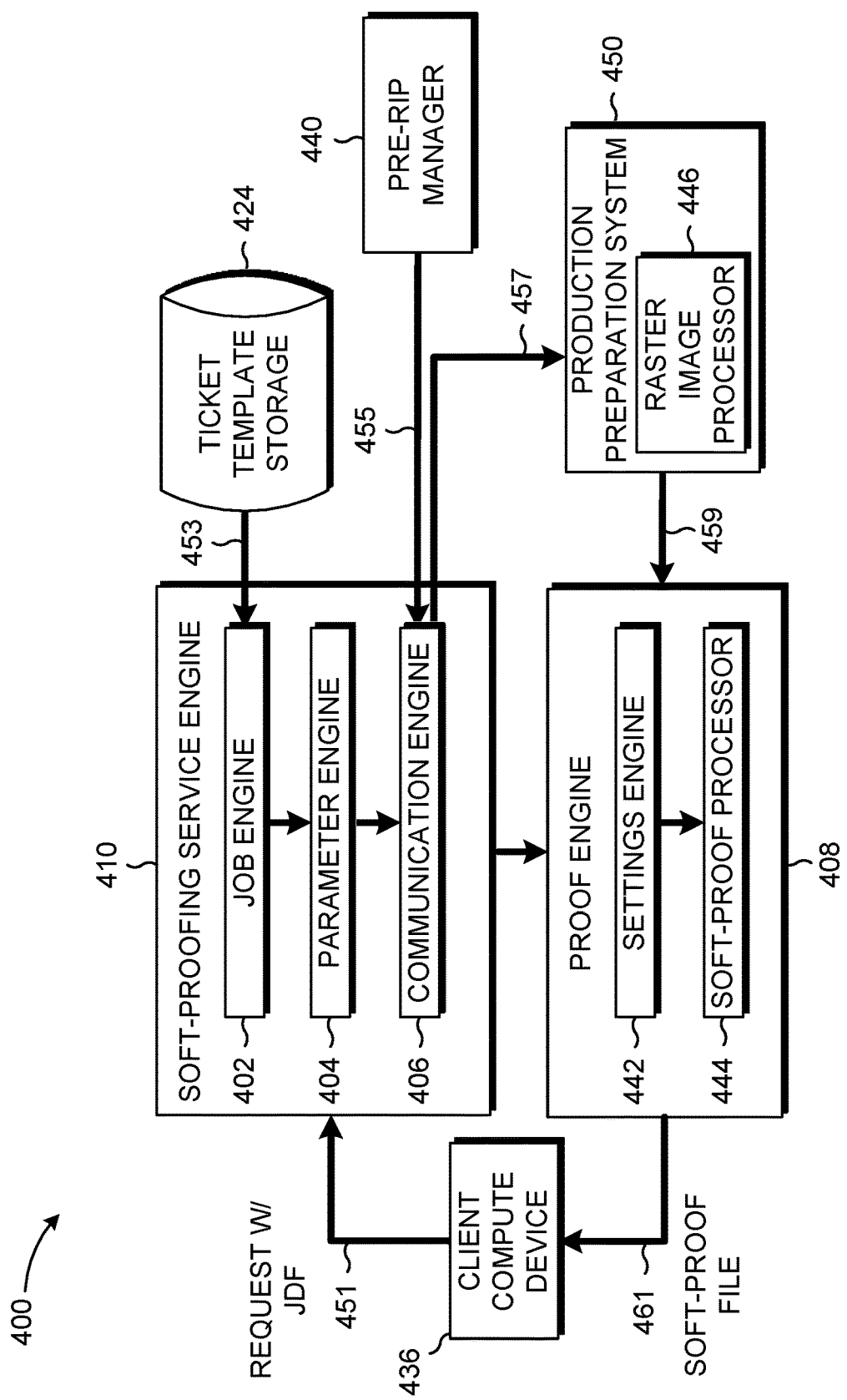
FIG. 4 depicts example operations among example engines to implement example soft-proof systems.

FIG. 4 depicts example operations among example engines to implement example soft-proof systems. Referring to FIG. 4, the example engines of FIG. 4 generally include a soft-proofing service engine 410 and a proof engine 408. The soft-proofing service engine 410 comprises a job engine 402, a parameter engine 404, and a communication engine 406. The example engines 402, 404, 406, and 408 of FIG. 4 may represent the same engines as engines 102, 104, 106, and 108 of FIG. 1 and may be implemented on a compute device, such as service device 334 of FIG. 3.

In example operations, a client compute device 436 may send a soft-proof request 451 with a job definition file to the soft-proofing service engine 410. In response, a ticket template may be retrieved at 453 from the ticket template storage 424 (unless a ticket template is sent with the request 451). The pre-rip manager 440 may prepare the content for processing and the communication engine 406 may receive the pre-rip data at 455 and transfer the pre-rip data to the production preparation system 450 (e.g., the RIP system) to create the print-ready ripped data using the RIP 446. The ripped data is then transferred to the proof engine 408 at 459. For example, the proof engine 408 may periodically check a folder for a ripped file produced by a RIP 446 and forward the ripped filed to a processor resource to a processor queue upon a determination of the existence of the ripped file in the folder. The settings engine 442 represents a combination of circuitry and executable instructions to identify the settings to use to produce the soft-proof from the ticket template. The soft-proof file may be produced by the soft-proof processor 444 and transferred to the client compute device 436 at 461.

Figure 5:
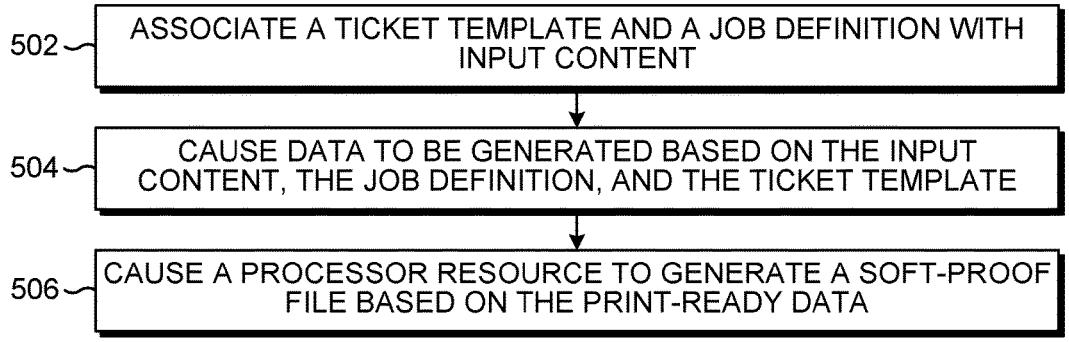
FIGS. 5-7 are flow diagrams depicting example methods for generating a soft-proof file.
Figure 6:
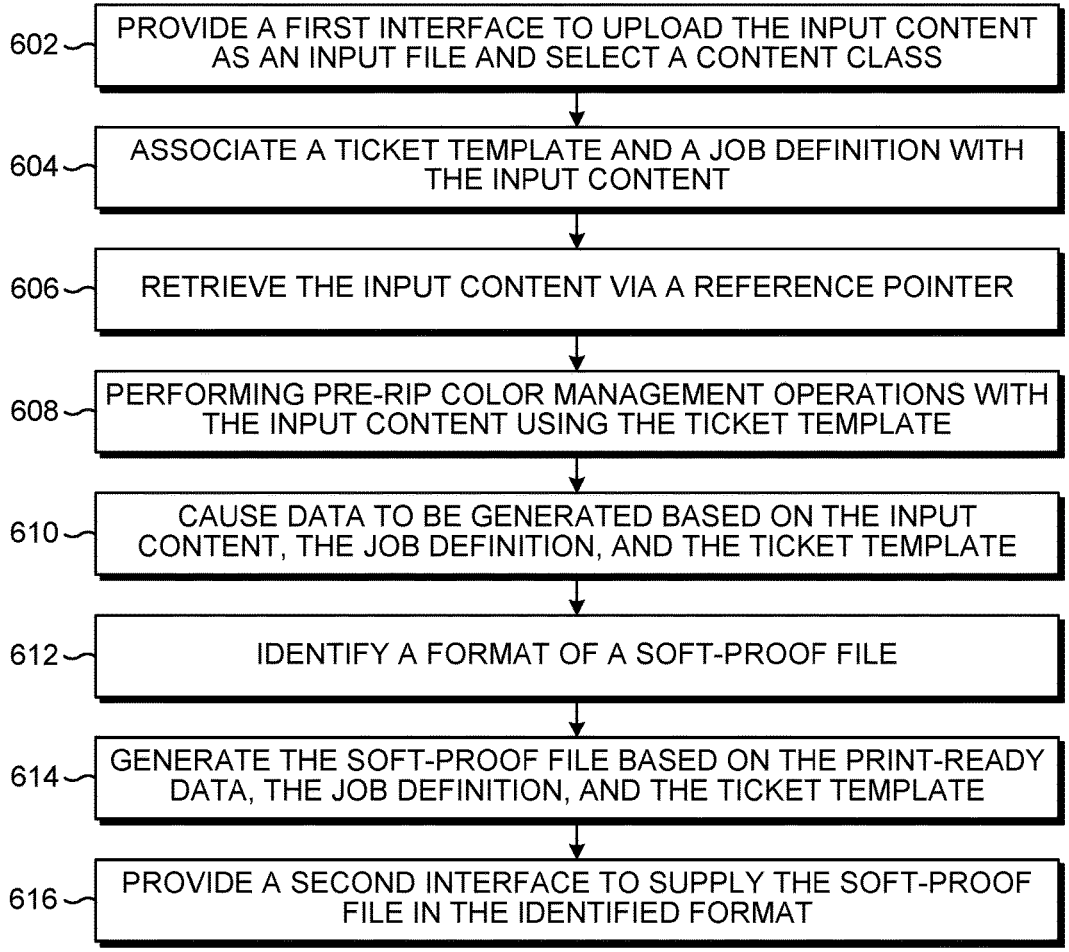
Figure 7:
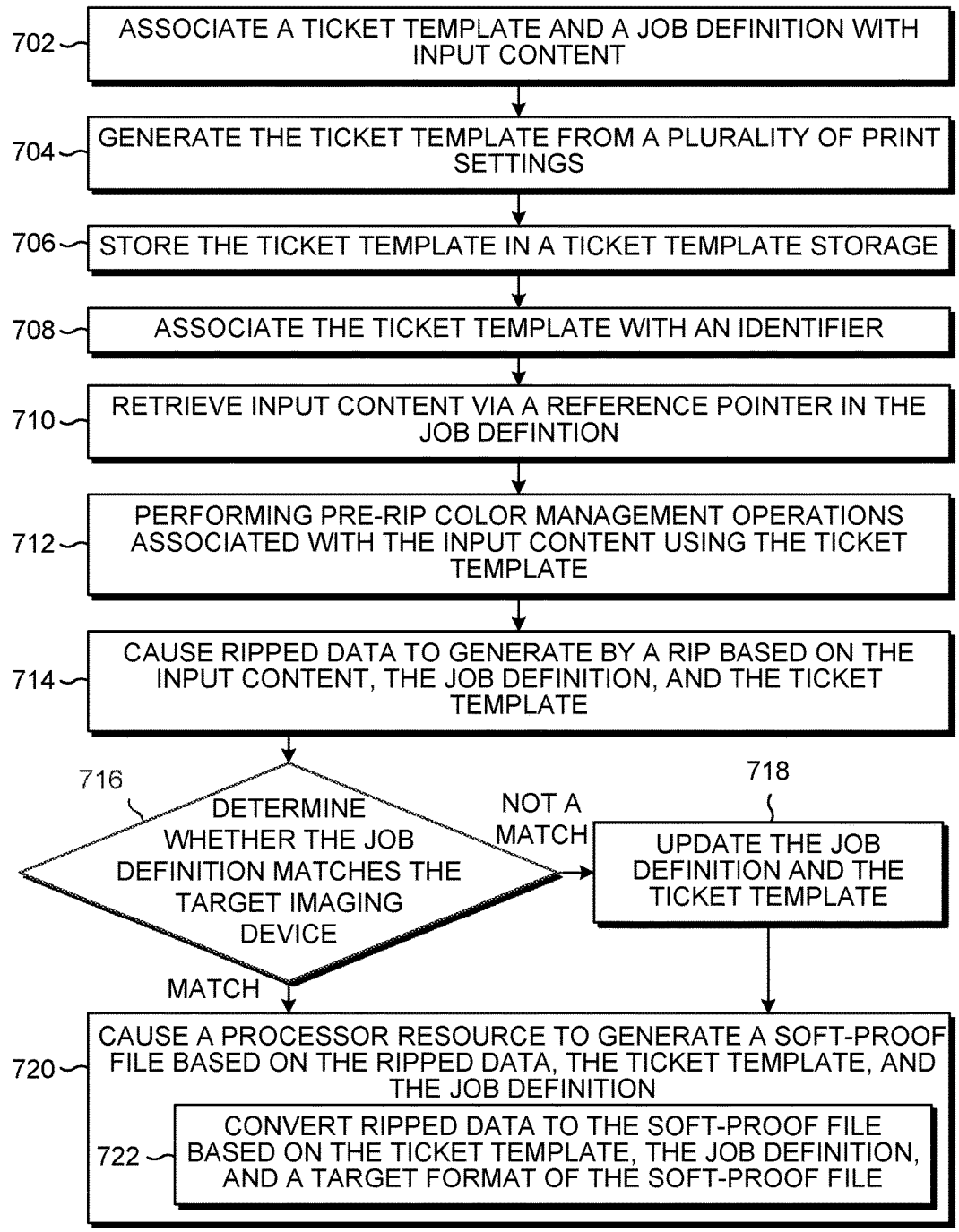

FIGS. 5-7 are flow diagrams depicting example methods for generating a soft-proof file. Referring to FIG. 5, example methods for generating a soft-proof file can generally comprise associating a ticket template and a job definition with input content; causing data to be generated based on the input content, the job definition, and the ticket template; and causing a processor resource to generate a soft-proof file based on the print-ready data.

At block 502, a ticket template and a job definition are associated with input content. For example, the job definition can be identified with the input content using a pointer in the job definition file and the ticket template can be associated with the input contents using an identifier. As an example, the ticket template and the job definition can be associated with input contents by the job engine 102 of FIG. 1, as discussed herein.

At block 504, print-ready data is caused to be generated by a production preparation system based on the input content, the job definition, and the ticket template. The production preparation system may be instructed to apply a plurality of parameters from the job definition and the ticket template on the input content to produce data that is formatted to be readable by the target imaging device for production. As an example, the print ready data may comprise ripped data may be caused to be generated by the communication engine 106 of FIG. 1 when in communication with a production preparation system that includes a RIP.

At block 506, a soft-proof file is caused to be generated based on the print-ready data, the ticket template, and the job definition. Data may be converted at each processing operation using parameters derived from the job definition and/or the ticket template. For example, ripped data may be converted into a soft-proof file by using at least one of an output file of the ticket template and a CMYK data and spot color information of the ticket template. For another example, the input content may be converted to at least one of CMYK values, RGB values, and device-independent color space values associated with spot colors (e.g., spot color information) as indicated by the ticket template and job definition combination. As an example, the soft-proof file may be generated by the proof engine 108 of FIG. 1.

FIG. 6 includes blocks similar to blocks of FIG. 5 and provides additional blocks and details. In particular, FIG. 6 depicts additional blocks and details generally regarding interfacing with a soft-proof system, retrieving the input content, performing the pre-rip color management operations, and identifying a format of a soft-proof file. Blocks 604, 610, and 614 are similar to blocks 502, 504, and 506 of FIG. 5 and, for brevity, their respective descriptions are not repeated.

At block 602, a first interface is provided. The first interface may be an electronic communication mechanism, such as an API, that comprises the functionality to upload the input content as an input file and select a class of content for production. For example, the input content may be directly uploaded in an electronic file having an artifact format (e.g., image format) compatible with the soft-proof system. For another example as depicted in FIG. 6, the input content may be uploaded using a job definition file as the input file, where the job definition, as discussed herein, contains a reference pointer to the input content. The input content may be retrieved via the reference pointer at block 606.

At block 608, pre-rip color management operations are performed on the input content using the ticket template. For example, in response to a determination that the ticket template and/or job definition contain print settings to perform pre-rip processing, the pre-rip management operations may be identified and performed before initiating the ripping process.

At block 612, a target format of the soft-proof file is identified. As examples, the format of the soft-proof file may be selected by the user, provided by the print job, or identified by the system based on the soft-proofing request (e.g., based on the job definition). The format of the soft-proof file may be any image format compatible with the soft-proof system, such as any image format made available to use as input content. The soft-proof file is then generated based on the print-ready data (e.g., convert the ripped data into the identified format for display to the user).

At block 616, a second interface is provided. The second interface may be an electronic communication mechanism, such as an API, to supply the soft-proof file in the identified format to the user (e.g., transfer the soft-proof file to the client device that made the soft-proof request).

FIG. 7 includes blocks similar to blocks of FIGS. 5 and 6 and provides additional blocks and details. In particular, FIG. 7 depicts additional blocks and details generally managing ticket templates, determining whether the job definition matches the target imaging device, updating the job definition and/or the ticket template, and generating the soft-proof file. Blocks 702, 710, 712, and 714 are similar to blocks 604, 606, 608, and 610 of FIG. 6 and, for brevity, their respective descriptions are not repeated.

At block 704, a ticket template is generated from a plurality of print settings. The ticket template may be generated, for example, for a new class of input content. The ticket template may comprise a plurality of print settings identified at a production device, such as settings corresponding to a plurality of inputs of a digital front end (DFE). For example, in response to a set of selections on the DFE for a print job and a determination that a ticket template does not already exist for the plurality of inputs, a ticket template is created. The generated ticket template may be stored in a ticket template storage, such as a data store, at block 706 and the ticket template is associated with an identifier at block 708. The identifier can then be used for later retrieval of the ticket template to avoid creating ticket template duplicates. For example, the ticket template may be generic or PSP-specific and is to be used for both production and soft-proofing.

At block 716, a determination as to whether the job definition matches the target imaging device is made. The job definition and the ticket template should correspond with the capabilities of the imaging device used for production and the capabilities of the PSP (e.g., as defined by the available content classes). If the job definition and/or ticket template do not match (e.g., the combination of the job definition and ticket template do not correspond to the target imaging device), then job definition and/or ticket template may be updated at block 718. The determination that the job definition and/or the ticket template do not match may be based on identifiers. Operations of the production preparation system, such as, for example, pre-rip processing operations and ripping operations, may be reprocessed with the updated job definition and/or ticket template before producing the soft-proof file.

At block 722, the generation of the soft-proof tile may comprise the ripped data being converted to the soft-proof file based on the ticket template, the job definition, and the target format of the soft-proof file. As discussed herein, using the print-ready data as the source of the soft-proof and converting the data using the plurality of ticket template and job definition settings that are used for print production may, for example, maintain fidelity to colors expected by the customer or may otherwise maintain accuracy of the soft-proof when displayed.

Although the flow diagrams of FIGS. 4-7 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present description.

The present description has been shown and described with reference to the foregoing examples. It is understood, however, that other forms, details, and examples may be made without departing from the spirit and scope of the following claims. The use of the words "first," "second," or related terms in the claims are not used to limit the claim elements to an order or location, but are merely used to distinguish separate claim elements.

All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A soft-proof system comprising:
a processor; and
a non-transitory computer-readable storage medium comprising instructions executed by the processor to:
obtain a job definition and a ticket template compatible with a device class of a target imaging device and usable with a class of content acceptable by a print service provider;
identify a plurality of parameters of the ticket template;
receive pre-rip data;
transfer the pre-rip data to a production preparation system to generate print-ready data by a raster image processor (RIP) based on the pre-rip data, content for production, the plurality of parameters of the ticket template, and the job definition, wherein the print-ready data comprises image element information formatted for use by the target imaging device in a production operation; and
transfer the print-ready data to a proof engine to generate a soft-proof file based on the print-ready data generated by the RIP, the job definition, and the plurality of parameters of the ticket template.

2. The system of claim 1, wherein the processor is further to:
store the ticket template in a ticket template storage in response to a determination that the ticket template is not in the ticket template storage; and
designate an identifier to associate with the ticket template, the identifier designated as particular to the class of content and the device class used for print production.

3. The system of claim 1, wherein:
the processor interfaces with a digital front end to obtain the job definition and the ticket template;
the processor interfaces with the RIP using a RIP communication protocol, wherein the print-ready data comprises ripped data produced by the RIP; and
the processor interfaces with a client application to store the soft-proof file in a client storage.

4. The system of claim 1, wherein:
the job definition comprises a job specification of the target imaging device including print settings, a pointer to the ticket template, and a pointer to content; and
the ticket template comprises a data structure of configuration settings including color management settings specific to the target imaging device, a print service provider, and a print job for the content.

5. The system of claim 1, wherein the processor interfaces with a processor resource of a three dimensional (3D) print preparation system and the print-ready data comprises 3D layer information including color management information.

6. A non-transitory computer-readable storage medium comprising a set of instructions executable by a processor resource to:
retrieve, using an identifier, a ticket template from a ticket template storage based on a job definition file, a class of content, and a print service provider, wherein the job definition file comprises a data structure having a reference pointer to input content and the ticket template comprises a plurality of parameters usable at production by the print service provider;
receive pre-rip data;
transfer the pre-rip data to a production preparation system to generate print-ready data by a raster image processor (RIP) based on the ticket template, the job definition file, and the input content; and
cause the processor resource to transfer the print-ready data to a proof engine to generate a soft-proof file based on the print-ready data generated by the RIP, the job definition file, and the ticket template.

7. The medium of claim 6, wherein the set of instructions is executable by the processor resource to:
preprocess the input content using the ticket template.

8. The medium of claim 6, wherein the set of instructions is executable by the processor resource to at least one of:
convert the print-ready data to the soft-proof file using an output profile of the ticket template; and
convert the print-ready data to the soft-proof file using cyan magenta yellow black (CMYK) data and spot color information.

9. The medium of claim 8, wherein the input content is converted to at least one of CMYK values, red green blue (RGB) values, and device-independent color space values associated with spot colors of the spot color information.

10. The medium of claim 6, wherein the set of instructions is executable by the processor resource to:
- download the job definition file from a shared folder using a reference pointer supplied by a communication protocol in a job message format;
- identify print settings based on the job definition file;
- check a folder periodically for a ripped file comprising the print-ready data; and
- forward the ripped file to a processor queue upon a determination of existence of the ripped file in the folder.

11. A method for generating a soft-proof file comprising:
- associating a ticket template and a job definition with input content, the job definition to include device information of a target imaging device and the ticket template to include a plurality of parameters associated with a class of content producible by a print service provider;
- receiving pre-rip data;
- transferring the pre-rip data to a production preparation system to generate print-ready data by a raster image processor (RIP) based on the input content, the job definition, and the ticket template, the print-ready data formatted to be readable by the target imaging device for production; and
- transferring the print-ready data to a proof engine to cause a processor resource to generate a soft-proof file based on the print-ready data generated by the RIP, the ticket template, and the job definition.

12. The method of claim 11, comprising:
- providing a first interface to upload the input content as an input file and select the class of content;
- identifying a target format of the soft-proof file; and
- providing a second interface to supply the soft-proof file in the identified format.

13. The method of claim 11, comprising:
- generating the ticket template from a plurality of inputs of a digital front end;
- storing the ticket template in a ticket template storage; and
- associating the ticket template with an identifier.

14. The method of claim 11, comprising:
- retrieving the input content via a reference pointer in the job definition; and
- performing pre-raster-image-processing (pre-RIP) color management operations associated with the input content using the ticket template;

wherein:
- the print-ready data comprises ripped data generated by the RIP; and
- the causing the processor resource to generate a soft-proof file comprises converting the ripped data to the soft-proof file based on the ticket template, the job definition, and a target format of the soft-proof file.

15. The method of claim 11, comprising:
- determining whether the job definition matches the target imaging device; and
- updating the job definition and the ticket template when the job definition does not match the target imaging device.

* * * * *